(12) United States Patent
Sainath et al.

(10) Patent No.: US 10,762,894 B2
(45) Date of Patent: *Sep. 1, 2020

(54) CONVOLUTIONAL NEURAL NETWORKS

(71) Applicant: Google LLC, Mountain View, CA (US)

(72) Inventors: Tara N. Sainath, Jersey City, NJ (US); Maria Carolina Parada San Martin, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 967 days.

This patent is subject to a terminal disclaimer.

(21) Appl. No.: 14/805,704

(22) Filed: Jul. 22, 2015

(65) Prior Publication Data

US 2016/0283841 A1 Sep. 29, 2016

Related U.S. Application Data

(60) Provisional application No. 62/139,139, filed on Mar. 27, 2015.

(51) Int. Cl.
*G10L 15/16* (2006.01)
*G06N 3/04* (2006.01)
*G10L 15/08* (2006.01)

(52) U.S. Cl.
CPC .......... *G10L 15/16* (2013.01); *G06N 3/0454* (2013.01); *G10L 2015/088* (2013.01)

(58) Field of Classification Search
CPC .. G10L 15/16; G10L 2015/088; G06N 3/0454
See application file for complete search history.

(56) References Cited

U.S. PATENT DOCUMENTS

| 6,041,299 | A | * | 3/2000 | Schuster | G10L 15/16 704/232 |
| 8,463,025 | B2 | | 6/2013 | Melvin et al. | |
| 8,676,728 | B1 | * | 3/2014 | Velusamy | H04R 1/406 706/12 |
| 2007/0211064 | A1 | * | 9/2007 | Buck | G06N 3/08 345/519 |
| 2014/0180989 | A1 | | 6/2014 | Krizhevsky et al. | |

(Continued)

OTHER PUBLICATIONS

Chang, Shuo-Yiin and Nelson Morgan. "Robust CNN-based Speech Recognition with Gabor Filter Kernels" 2014 [Online] Downloaded Jan. 9, 2018 https://mazsola.iit.uni-miskolc.hu/~czap/letoltes/IS14/IS2014/PDF/AUTHOR/IS140259.PDF.*

(Continued)

*Primary Examiner* — Ben M Rifkin
(74) *Attorney, Agent, or Firm* — Oblon, McClelland, Maier & Neustadt, L.L.P.

(57) ABSTRACT

Methods, systems, and apparatus, including computer programs encoded on computer storage media, for keyword spotting. One of the methods includes training, by a keyword detection system, a convolutional neural network for keyword detection by providing a two-dimensional set of input values to the convolutional neural network, the input values including a first dimension in time and a second dimension in frequency, and performing convolutional multiplication on the two-dimensional set of input values for a filter using a frequency stride greater than one to generate a feature map.

16 Claims, 5 Drawing Sheets

(56) References Cited

U.S. PATENT DOCUMENTS

2015/0032449 A1  1/2015  Sainath et al.

OTHER PUBLICATIONS

Search notes for date evidence fo UFLDL reference.*
Chang, Shuo-Yiin and Nelson Morgan. "Robust CNN-based Speech Recognition with Gabor Filter Kernels" 2014 [Online] Downloaded Jan. 9, 2018 https://mazsola.iit.uni-miskolc.hu/~czap/letoltes/IS14/IS2014/PDG/AUTHOR/IS140259.PDF.*
He, Kaiming and Jlan Sun. "Convolutional Neural Netowrks at Constrianed Time Cost" Dec. 4, 2014 [Online] Downlaoded Jan. 9, 2018 https://arxiv.org/pdf/1412.1710.pdf.*
Jaderberg, Max et al "Speeding up Convolutional Neural Networks with Low Rank Expansions" 2014 [Online] Downloaded Jan. 9, 2018 https://www.robots.ox.ac.uk/~vgg/publications/2014/Jaderberg14b/jaderberg14b.pdf.*
UFLDL Tutorial "Pooling" Online 2011 [Online] Downlaoded Jan. 9, 2018 http://ufldl.stanford.edu/tutorial/supervised/Pooling/.*
Wheeler, David. "Voice recognition will always be stupid" 2013 [Online] Downloaded Jan. 9, 2018 http://www.cnn.com/2013/08/20/opinion/wheeler-voice-recognition/index.html.*
Szegedy, Christian et al. "Intriguing properties of Neural Networks" Feb. 2014 [Online] Downloaded Jul. 10, 2018 https://arxiv.org/pdf/1312.6199.pdf.*
Tara N. Sainth et al "Improvements to Deep Convolutional Neural Networks for LVCSR" [Online] Downloaded Jan. 30, 2019 https://ieeexplore.ieee.org/stamp/stamp.jsp?tp=&arnumber=6707749 (Year: 2013).*
Ossama Adbel-Hamid et al "Convolutional Neural Networks for Speech Recognition" [Online] Downloaded Jan. 30, 2019 https://ieeexplore.ieee.org/stamp/stamp.jsp?arnumber=6857341 (Year: 2014).*
Toth, Laszlo, "Combining Time and Frequency Domain COnvolution in Convolutional Neural NEtwork-Based Phone Recognition" IEEE 2014 [Online] Downloaded Dec. 6, 2019 https://ieeexplore.ieee.org/stamp/stamp.jsp?tp=&arnumber=6853584 (Year: 2014).*
Abdel-Hamid et al., "Applying Convolutional Neural Network Concepts to Hybrid NN-HMM Model for Speech Recognition," Acoustics, Speech and Signal Processing (ICASSP), 2012 IEEE International Conference on, pp. 4277-4280, Mar. 2012.
Abdel-Hamid et al., "Convolutional Neural Networks for Speech Recognition," IEEE/ACM Transactions on Audio, Speech, and Language Processing, 22(10):1-13, Oct. 2014.
Anonymous, "An Introduction to Convolutional Neural Networks," Stanford.edu, Jun. 9, 2013 [retrieved on Apr. 29, 2015]. Retrieved from the Internet: URL<http://white.stanford.edu/teach/index.php/An_Introduction_to_Convolutional_Neural_Networks>, 5 pages.
Chen et al., "Small-Footprint Keyword Spotting Using Deep Neural Networks," Acoustics, Speech and Signal Processing (ICASSP), 2014 IEEE International Conference on, pp. 4087-4091, May 2014.
U.S. Appl. No. 13/860,982, "Keyword detection without decoding," filed Apr. 11, 2013, 37 pages.
U.S. Appl. No. 13/861,020, "Keyword detection based on acoustic alignment," filed Apr. 11, 2013, 31 pages.
Dean et al., "Large Scale Distributed Deep Networks," Advances in Neural Information Processing Systems 25, pp. 1232-1240, 2012.
Karpathy et al., "Large-scale Video Classification with Convolutional Neural Networks," Computer Vision and Pattern Recognition (CVPR), 2014 IEEE Conference on, pp. 1725-1732, Jun. 2014.
Keshet et al., "Discriminative Keyword Spotting," Speech Communication, 51(4): 317-329, Apr. 2009.
LeCun et al., "Convolutional Networks for Images, Speech, and Time-Series," The handbook of brain theory and neural networks, pp. 255-258, 1998.
LeCun et al., "Learning Methods for Generic Object Recognition with Invariance to Pose and Lighting," Computer Vision and Pattern Recognition, 2004. CVPR 2004. Proceedings of the 2004 IEEE Computer Society Conference on, vol. 2, pp. II-97-II-104, Jun.-Jul. 2004.
Sainath et al., "Convolutional, Long Short-Term Memory, Fully Connected Deep Neural Networks," $40^{th}$ IEEE International Conference on Acoustics, Speech and Signal Processing (ICASSP), Apr. 2015, 5 pages.
Sainath et al., "Deep Convolutional Neural Networks for Large-scale Speech Tasks," Neural Networks, vol. 64, pp. 39-48, Apr. 2015.
Sainath et al., "Deep Convolutional Neural Networks for LVCSR," in Proc. ICASSP, May 2013, 5 pages.
Sainath et al., "Deep Scattering Spectra with Deep Neural Networks for LVCSR Tasks," in Proc. Interspeech, Sep. 2014, 5 pages.
Sainath et al., "Improvements to Deep Convolutional Neural Networks for LVCSR," arXiv:1309.1501v3 [cs.LG], Dec. 2013, 7 pages.
Sainath et al., "Low-Rank Matrix Factorization for Deep Neural Network Training with High-Dimensional Output Targets," Acoustics, Speech and Signal Processing (ICASSP), 2013 IEEE International Conference on, pp. 6655-6659, May 2013.
Sainath, "Improvements to Deep Neural Networks for Large Vocabulary Continuous Speech Recognition Tasks," IBM T.J. Watson Research Center, Jan. 19, 2014, pp. 1-57.
Schalkwyk et al., "Google Search by Voice: A case study," in Advances in Speech Recognition: Mobile Environments, Call Centers and Clinics, chapter 4, pp. 61-90. Springer, 2010.
Sensory [online], "Technologies for a Secure and Superior User Experience," Sensory.com Home page, Apr. 2015 [retrieved on Apr. 28, 2015]. Retrieved from the Internet: URL<http://www.sensory.com/>, 3 pages.
Toth, "Combining Time- and Frequency-Domain Convolution in Convolutional Neural Network-Based Phone Recognition," Acoustics, Speech and Signal Processing (ICASSP), 2014 IEEE International Conference on, May 2014, pp. 190-194.
Vesely et al., "Convolutive Bottleneck Network Features for LVCSR," Automatic Speech Recognition and Understanding (ASRU), 2011 IEEE Workshop on, pp. 42-47, Dec. 2011.
Wikipedia, "Convolutional neural network," Apr. 11, 2015 [retrieved Apr. 29, 2015], retrieved from the Internet: URL<https://en.wikipedia.org/wiki/Convolutional_neural_network>, 7 pages.

* cited by examiner

CONVOLUTIONAL NEURAL NETWORKS

CROSS-REFERENCE TO RELATED APPLICATIONS

This application claims priority to U.S. Provisional Application No. 62/139,139, filed on Mar. 27, 2015, the contents of which are incorporated herein by reference.

BACKGROUND

This specification generally relates to speech recognition systems.

With the development of mobile devices, some speech-related technologies are becoming popular. For example, search by voice services may utilize speech recognition to interact with mobile devices. Some existing keyword spotting (KWS) systems on mobile devices use deep neural networks (DNN), which are trained to predict sub-keyword targets. For instance, DNNs may be used for keyword spotting since DNN models may be adjusted by changing the number of parameters in the networks.

SUMMARY

In some implementations, a keyword detection system may use a convolutional neural network (CNN) for KWS, instead of a DNN, for small and large vocabulary tasks with fewer parameters, multiplication operations (multiplies), or both. In some implementations, a keyword detection system may use a CNN architecture that strides the filter in frequency to allow the system to remain within the computational constraints, e.g., to limit the number of multiplication operations used by the CNN to determine output. In some implementations, a keyword detection system may use a CNN architecture that pools in time to remain within computational constraints, e.g., to limit the number of parameters used by the CNN. For instance, when a keyword detection system is limited in a total number of parameters used, the keyword detection system may use a CNN and pool in time. In some implementations, a keyword detection system may use a CNN architecture that pools in time and frequency to improve KWS performance. The system may use a single CNN layer, e.g., a single convolutional block, when pooling in both time and frequency.

In general, one innovative aspect of the subject matter described in this specification can be embodied in methods that include the actions of training, by a keyword detection system, a convolutional neural network for keyword detection by providing a two-dimensional set of input values to the convolutional neural network, the input values including a first dimension in time and a second dimension in frequency, and performing convolutional multiplication on the two-dimensional set of input values for a filter using a frequency stride greater than one to generate a feature map. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Performing convolutional multiplication on the two-dimensional set of input values for the filter using the frequency stride greater than one to generate the feature map may include performing convolutional multiplication on the two-dimensional set of input values for the filter using a frequency stride of four to generate the feature map. Performing convolutional multiplication on the two-dimensional set of input values for the filter using the frequency stride greater than one to generate the feature map may include performing convolutional multiplication across the entire first dimension in time on the two-dimensional set of input values for the filter.

In some implementations, performing convolutional multiplication on the two-dimensional set of input values for the filter using a frequency stride greater than one may include performing convolutional multiplication on the two-dimensional set of input values for the filter using a time stride of one. Performing convolutional multiplication on the two-dimensional set of input values for the filter using a frequency stride greater than one to generate the feature map may include performing convolutional multiplication on the two-dimensional set of input values for the filter, the filter comprising a frequency size of eight and a time size of thirty-two. Performing convolutional multiplication on the two-dimensional set of input values for the filter using a frequency stride greater than one to generate the feature map may include performing convolutional multiplication on the two-dimensional set of input values for n different filters using a frequency stride greater than one for each of the n different filters to generate n different feature maps, each of the feature maps generated using a corresponding filter. Performing convolutional multiplication on the two-dimensional set of input values for the n different filters using a frequency stride greater than one for each of the n different filters to generate the n different feature maps may include performing convolutional multiplication on the two-dimensional set of input values for the n different filters, each of the n different filters having a size that is the same as the sizes of the other filters.

In some implementations, the convolutional neural network may be a layer in a neural network that includes a second, different convolutional neural network layer, a linear low rank layer, a deep neural network layer, and a softmax layer. Training, by the keyword detection system, a convolutional neural network for keyword detection may include generating, by the second, different convolutional neural network, second output using the feature map, generating, by the linear low rank layer, a third output using the second output, generating, by the deep neural network, a fourth output using the third output, and generating, by the softmax layer, a final output of the neural network using the fourth output. The feature map may be a matrix. The second output may include a matrix. Generating, by the linear low rank layer, a third output using the second output may include creating a vector from the second output, and generating the third output using the vector. The method may include updating the neural network using an accuracy of the final output.

In some implementations, training, by the keyword detection system, a convolutional neural network for keyword detection may include updating a set of weight values for the filter using the feature map without performing a pooling operation. The method may include providing the convolutional neural network to a device for keyword detection. The method may include using the convolutional neural network for keyword detection by receiving an audio signal encoding an utterance, analyzing the audio signal to identify a command included in the utterance, and performing an action that corresponds to the command.

In general, one innovative aspect of the subject matter described in this specification can be embodied in methods that include the actions of training, by a keyword detection system, a convolutional neural network for keyword detection by providing a two-dimensional set of input values to the convolutional neural network, the input values including a first dimension in time and a second dimension in frequency, performing convolutional multiplication on the two-dimensional set of input values for a filter to generate a feature map, and determining a value for a region of the feature map, the region including a time pooling dimension greater than one. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Determining the value for the region of the feature map, the region including a time pooling dimension greater than one may include determining the value for the region of the feature map, the region including a time pooling dimension of two. Determining the value for the region of the feature map may include determining the value for the region, the region including a frequency pooling dimension of three. Determining the value for the region of the feature map may include determining a maximum value for the region.

In some implementations, performing convolutional multiplication on the two-dimensional set of input values for the filter to generate the feature map may include performing convolutional multiplication on the two-dimensional set of input values for the filter using a frequency stride of one and a time stride of one. Performing convolutional multiplication on the two-dimensional set of input values for the filter to generate the feature map may include performing convolutional multiplication on the two-dimensional set of input values for the filter, the filter comprising a frequency size of eight and a time size of twenty-one. Determining the value for the region of the feature map may include determining a value for a region of each of the feature maps, each of the regions having a time pooling dimension that is the same as the time pooling dimension of the other regions. The convolutional neural network may be a layer in a neural network that includes a second, different convolutional neural network layer, a linear low rank layer, a deep neural network layer, and a softmax layer. Training, by the keyword detection system, a convolutional neural network for keyword detection may include generating, by the second, different convolutional neural network, second output using the value, generating, by the linear low rank layer, a third output using the second output, generating, by the deep neural network, a fourth output using the third output, and generating, by the softmax layer, a final output of the neural network using the fourth output.

The subject matter described in this specification can be implemented in particular embodiments and may result in one or more of the following advantages. In some implementations, a keyword spotting system that uses a CNN, e.g., to identify voice commands to wake up and have basic spoken interactions with a device, has a low latency, is power efficient, is flexible, e.g., a user experience designer or user can choose the keywords, is speaker adaptive, e.g., other speakers cannot activate the device, or two or more of these. In some implementations, a keyword spotting system that uses a CNN has a lower percentage of false alarms, false rejects, or both, compared to another keyword spotting system that only uses a DNN, e.g., when the CNN has either the same number of matrix multiplication operations or parameters as the DNN system. In some implementations, a keyword spotting system that uses a CNN has a small neural network model, e.g., less than about 250 kb, to allow the model to be stored in a small memory, e.g., a digital signal processor (DSP) memory. In some implementations, a keyword spotting system that uses a CNN has a ten percent relative improvement over a different keyword spotting system that uses only a DNN, e.g., while fitting into the constraints of each system.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
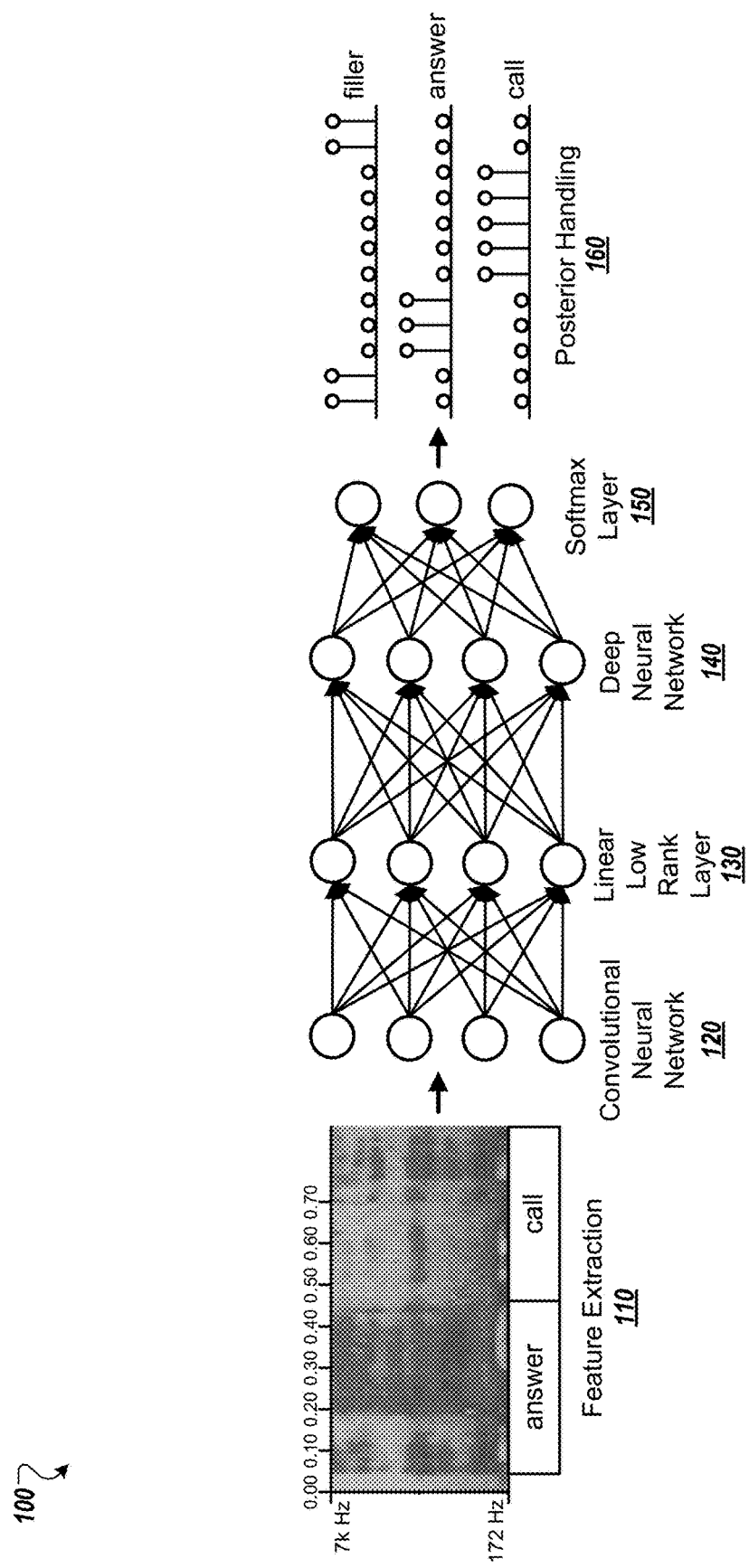
FIG. 1 is a block diagram of an example keyword spotting system 100 that includes a convolutional neural network and a deep neural network.

FIG. 1 is a block diagram of an example keyword spotting (KWS) system 100 that includes a convolutional neural network (CNN) and a deep neural network (DNS). In general, the KWS system 100 may include a feature extraction module 110, a CNN 120, a DNN 140, and a posterior handling module 160.

The KWS system 100 is trained to determine whether an audio signal encodes an utterance of a particular phrase, such as "answer call." When the KWS system 100 determines that an audio signal encodes the utterance "answer call," the KWS system 100 may send a signal to another system, e.g., an application executing on a device, such as a mobile device, indicating that the utterance "answer call" was identified. In response, the application may perform an action, such as answering an incoming call on the mobile device. When the KWS system 100 determines that an audio signal encodes an utterance for which the KWS system 100 is not trained, the KWS system 100 performs no action.

The KWS system 100 may trigger or perform different actions for different keywords or key phrases for which the KWS system 100 is trained. For instance, when the KWS system 100 detects the utterance "answer call," the KWS system 100 may trigger a phone application, e.g., to answer an incoming telephone call. When the KWS system 100 detects the utterance "give me directions to," the KWS system 100 may cause a map application to launch.

The feature extraction module 110 may compute dimensional log-mel filterbank features over a particular time period using a time frame shift. At every frame, the feature extraction module 110 may stack a particular number of frames to the left and different number of frames to the right. A single frame or a stack of frames is used as input to the CNN 120.

The CNN 120 receives the input and, as described in more detail below, generates feature maps as output. The CNN 120, or another component of the KWS system 100, may convert the feature maps to a vector and provide the vector to a linear low-rank layer 130. The linear low-rank layer 130 processes the vector and provides output to the DNN 140. In some examples, the linear low-rank layer 130 is a first layer in the DNN 140.

The DNN 140 may include one or more hidden layers, e.g., two or three hidden layers. Each hidden layer may include 128 hidden units. Each hidden layer in the DNN 140 may use a rectified linear unit (ReLU) nonlinearity or any other appropriate algorithm to compute output. The DNN 140 may process the output received from the linear low-rank layer 130 using the hidden layers and provide updated output to a softmax layer 150. In some examples, the softmax layer 150 is part of the DNN 140.

The softmax layer 150 may contain one output target for each of the words in the keyword or key phrase to be detected, e.g., the phrase "answer call," and a single additional output target which may represent all frames that do not belong to any of the words in the keyword, as represented as 'filler'. The neural network weights, e.g., of the DNN 140, may be trained to optimize a cross-entropy criterion using distributed asynchronous gradient descent.

In examples when the KWS system 100 detects multiple keywords or key phrases, the KWS system 100 includes an output target for each word in each of the keywords and key phrases. For example, when the KWS system 100 is trained to detect only the key phrases "answer call" and "give me directions to," the softmax layer 150 has six output targets, one for each of the words. The softmax layer 150 may optionally have an additional output target for filler, increasing the total number of output targets to seven.

The DNN 140 generates an output, using the vector from the CNN 120 that was processed by the linear low-rank layer 130, and provides the output to the softmax layer 150. The softmax layer 150 processes the output and provides updated output to the posterior handling module 160.

The posterior handling module 160 may generate individual frame-level posterior scores using the output from the DNN 140, e.g., from the softmax layer 150. The posterior handling module 160 may combine the frame-level posterior scores into a single score corresponding to the key phrase. For example, the posterior handling module 160 may combine the scores from consecutive frames for "answer" and "call" to determine whether an audio signal encoded the utterance "answer call."

For instance, for each frame, the CNN 120 may generate output using the corresponding frame from the feature extraction module 110 as input. The CNN 120 provides the output to the DNN 140, which includes the linear low-rank layer 130 and the softmax layer 150, and the DNN 140 generates second output and provides the second output to the posterior handling module 160.

The KWS system 100 may include multiple CNN layers in the CNN 120, multiple DNN layers in the DNN 140, or both. For instance, the KWS system 100 may include two CNN layers, between the feature extraction module 110 and the linear low-rank layer 130. In some examples, the KWS system 100 may include two DNN layers, between the linear low-rank layer 130 and the softmax layer 150.

When the KWS system 100 includes multiple layers of a particular type, each of these layers may have different attributes, e.g., a different number of multiplies, a different number of parameters, a different number of units in each layer, or two or more of these. For example, a first DNN layer may have 4.1 K parameters and a second DNN layer may have 16.4K parameters.

Figure 2:
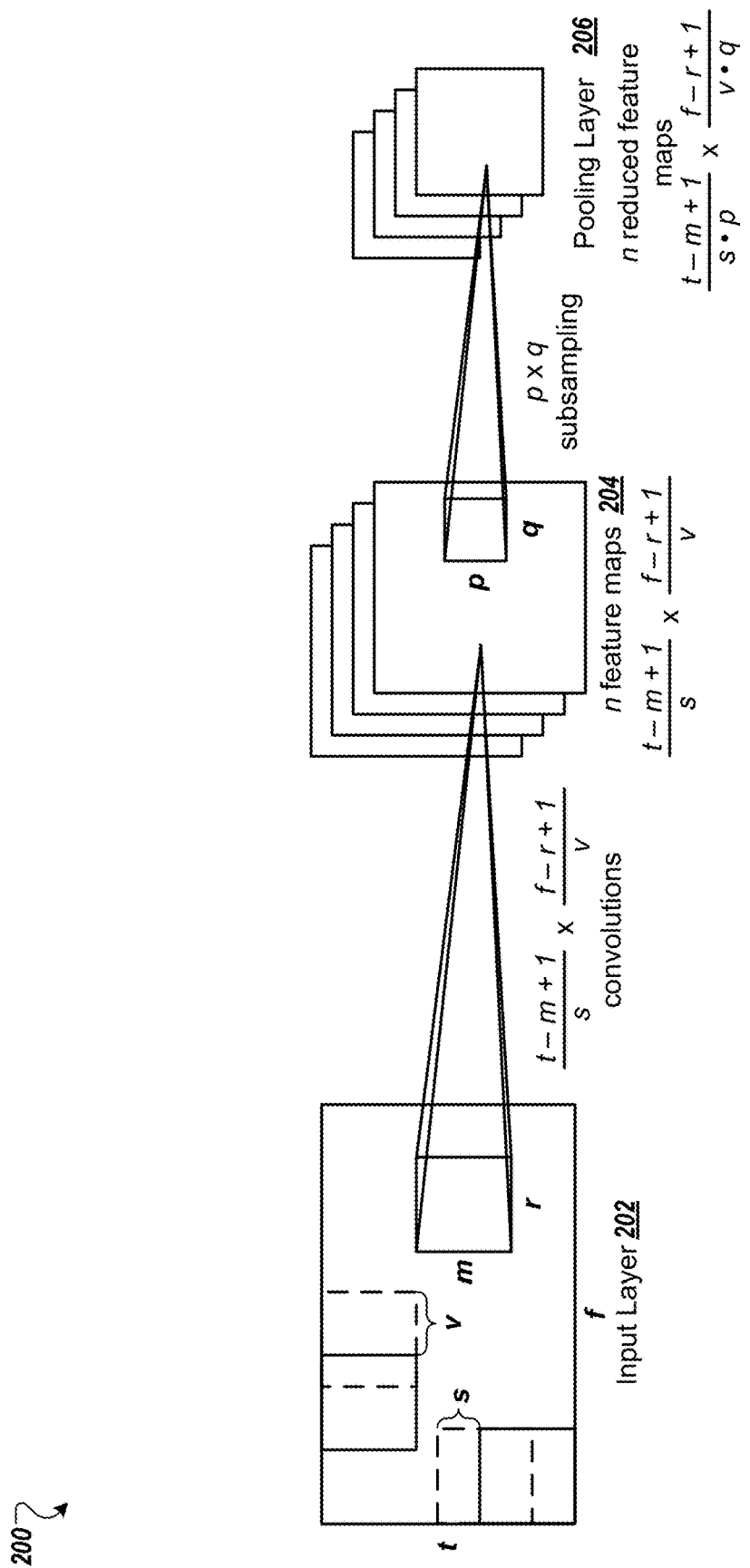
FIG. 2 represents an example CNN.

FIG. 2 represents an example CNN 200, e.g., for a KWS system. The CNN 200 receives an input signal $V \in \Re^{t \times f}$, where t is the input feature dimension in time of the input signal and f is the input feature dimension in frequency of the input signal. For instance, the CNN 200 receives the input signal from a feature extraction module and uses the input signal to create a matrix of input values for an input layer 202.

The input signal includes frequency values across time. For instance, the CNN 200 may receive forty frequency value for each time frame and frequency values for thirty-two different time frames. The CNN 200 combines these values to create a matrix of input values for the input layer 202.

The CNN 200 includes a weight matrix $W \in \Re^{(m \times r) \times n}$. The weight matrix W spans across a time-frequency area, of the input layer 202, of size m×r, e.g., defined by a filter, where m≤t and r≤f. The CNN 200 convolves the time-frequency area of the input layer 202, defined by the filter, with the weight matrix W to produce n feature maps 204, each of which have a size that satisfies Equation 1 below.

$$\frac{(t-m+1)}{s} \times \frac{(f-r+1)}{v} \qquad (1)$$

The CNN 200 uses the filter to stride the input layer 202, e.g., to move the filter across the input layer 202, by a non-zero amount s in time and v in frequency. For example, when the CNN 200 first convolves the weight matrix W with the input layer 202, the CNN 200 selects an area, defined by the filter, starting at the coordinates 0,0 to determine a first value for a feature map. With a filter size of m×r, the area is defined by 0,0 and m,r. The CNN 200 may then select a second area, defined by the filter, starting at the coordinates m,0 and convolve the area defined by m,0 and 2m,r to determine a second value for the feature map. The CNN 200 may continue with this process to define all $$\frac{(t-m+1)}{s} \times \frac{(f-r+1)}{v}$$

values of the feature map.

The CNN 200 uses weight sharing, e.g., to model local correlations in the input signal. For instance, the CNN 200 uses the same weights for each filter applied to the input layer 202 to generate the values for a single feature map. The CNN 200 may use a different set of weights to generate each of the features maps, while the same set of weights is used to generate each value in a particular feature map.

The weight matrix W has n hidden units to allow the CNN 200 to generate n feature maps 204. For instance, the CNN 200 uses each of the n hidden units, or n different filters, to determine different properties of the input layer. For example, one hidden unit may focus on tone and another hidden unit may focus on pitch when the input layer 202 models speech. In some examples, the sizes of each of the n different filters, and the corresponding matrices in the weight matrix W, are the same. In some examples, each of the n feature maps 204 has the same size as the other feature maps 204.

After performing convolution for each of the n hidden units to generate the n feature maps 204, the CNN 200 may use subsampling to pool values from a particular feature map with other values from the particular feature map, e.g., to reduce the time-frequency space. For instance, the CNN may generate a pooling layer 206, e.g., a max-pooling layer, to remove variability in the time-frequency space, e.g., that exists due to different speaking styles, channel distortions, etc.

The CNN 200 may use a pooling size of p×q to create n reduced feature maps in the pooling layer 206 from the n feature maps 204. In some examples, each of the n reduced feature maps has a time-frequency space dimension that satisfies Equation 2 below. In some examples, some of the n reduced feature maps have a different size.

$$\frac{(t-m+1)}{s \cdot p} \times \frac{(f-r+1)}{v \cdot q} \qquad (2)$$

The CNN 200 may use the n reduced feature maps in the pooling layer 206 to determine properties of the input signal, or provide the n reduced features maps, or values from those features maps, to another neural network layer, to name a few examples. For instance, the CNN 200 may represent each of the n reduced features maps as a matrix. The CNN 200 may generate a vector from each matrix, by concatenating each of the rows in the matrix, e.g., so that a row representing a particular instance in time is concatenated with an adjacent row representing a subsequent instance in time, and provide the vector as input to another layer in a neural network. In some examples, the CNN 200 may generate a vector for each of the n reduced features maps and concatenate each of those vectors to create a final vector and provide the final vector to another layer in a neural network, e.g., a DNN layer or a linear low-rank layer.

In some implementations, a convolutional architecture may include two convolutional layers, e.g., as part of a keyword spotting (KWS) system. For example, if the log-mel input into the CNN is t×f=32×40, e.g., the input layer 202 has t=30 and f=40, then a first CNN layer may have a filter size in frequency of r=9 and a filter size in time of m=20, e.g., a filter size in time which spans two thirds of the overall input size in time. For instance, the keyword spotting system with two convolutional layers may be less sensitive to the filter size in time compared to other keyword spotting systems.

The first CNN layer may perform convolutional multiplication by striding the filter by s=1 and v=1 across both time and frequency. In some examples, the first CNN layer may perform non-overlapping max-pooling in frequency, e.g., with a pooling region of q=3. The second CNN layer may have a filter size of r=4 in frequency and m=10 in time. The second CNN layer might not use max-pooling, or any pooling.

In some examples, when the number of parameters for a keyword spotting system must be below 250K, a typical architecture CNN architecture can be as shown in Table 1 as cnn-trad-fpool3. The cnn-trad-fpool3 architecture may have two CNN layers, one linear low-rank layer, one DNN layer, and one softmax layer.

TABLE 1

CNN Architecture for cnn-trad-fpool3

| Type | m | r | n | p | q | Parameters | Multiplies |
|---|---|---|---|---|---|---|---|
| CNN | 20 | 8 | 64 | 1 | 3 | 10.2K | 4.4M |
| CNN | 10 | 4 | 64 | 1 | 1 | 164.8K | 5.2M |
| Linear | — | — | 32 | — | — | 65.5K | 65.5K |
| DNN | — | — | 128 | — | — | 4.1K | 4.1K |
| Softmax | — | — | 4 | — | — | 0.5K | 0.5K |
| Total | — | — | — | — | — | 244.2K | 9.7M |

In some implementations, a KWS system may use a CNN architecture to limit the number of multiplies performed by the KWS system. For example, the CNN architecture may have one convolutional layer and have the time filter span all of time, e.g., m=32. The KWS system may provide the output of this CNN layer to a linear low-rank layer, which processes the output from the CNN. The KWS system then processes the output from the CNN with two DNN layers. Table 2 includes one example of the KWS system with a CNN layer, cnn-one-fpool3. The filter sizes s=1 and v=1 for CNN layer are omitted from Table 2.

TABLE 2

CNN Architecture for cnn-one-fpool3

| Type | m | r | n | p | q | Parameters | Multiplies |
|---|---|---|---|---|---|---|---|
| CNN | 32 | 8 | 54 | 1 | 3 | 13.8K | 4.6K |
| Linear | — | — | 32 | — | — | 19.8K | 19.8K |
| DNN | — | — | 128 | — | — | 4.1K | 4.1K |
| DNN | — | — | 128 | — | — | 16.4K | 16.4K |
| Softmax | — | — | 4 | — | — | 0.5K | 0.5K |
| Total | — | — | 4 | — | — | 53.8K | 5.0K |

In some implementations, when a KWS system pools in frequency q=3, the KWS system strides the filter by v=1. In some examples, this may increase multiplies, e.g., multiplication operations performed by the KWS system. To reduce the number of multiplies, a KWS system may stride the filter by v>1. Table 3 represents example CNN architectures, cnn-one-fstride4 and cnn-one-fstride8, which use a frequency filters of size r=8 and stride the filter by v=4, e.g., 50% overlap between adjacent filters, and by v=8, e.g., no overlap between adjacent filters, respectively. Table 3 illustrates that striding the filter by v>1 the number of multiplies, e.g., multiplication operations performed by the CNN, is reduced. To maintain accuracy of the CNN, and the number of hidden units n in the CNN may be increased. A KWS system that includes a CNN architecture indicated in Table 3 may include a linear low-rank layer, one or more DNN layers, and a softmax layer.

TABLE 3

CNN Architecture for (a) cnn-one-fstride4 and (b) cnn-one-fstride8

| Model | m | r | n | s | v | Parameters | Multiplies |
|---|---|---|---|---|---|---|---|
| CNN (a) | 32 | 8 | 186 | 1 | 4 | 47.6K | 4.3K |
| CNN (b) | 32 | 8 | 336 | 1 | 8 | 86.6K | 4.3K |

In some implementations, a KWS system may increase a number of CNN parameters when the number of CNN multiplies is fixed. For instance, a KWS system may limit a CNN model size to include at most 250K parameters and not limit the number of CNN multiplies.

In some examples, a KWS system may limit the number of parameters of a CNN model while increasing the number of feature maps to improve CNN performance. In these examples, the KWS system may sample, e.g., pool, in time and frequency to increase feature maps while keeping parameters fixed.

In some implementations, a KWS system may include a CNN architecture that strides a time filter in convolution by an amount of s>1. For example, Table 4 shows three CNN architectures: cnn-tstride2, cnn-tstride4 and cnn-tstride8, that include changes to the time filter stride. The number of feature maps n in a CNN may be increased by increasing the time filter stride such that the number of parameters in the CNN remains constant. Here the frequency stride v=1 and the pool in time p=1. In some implementations, subsampling in time might not degrade performance, as increasing the number of feature maps may offset the change to the stride in time, e.g., and may improve performance.

TABLE 4

CNN Architectures for striding in time

| Model | Type | m | r | n | s | q | Parameters |
|---|---|---|---|---|---|---|---|
| cnn-stride2 | CNN | 16 | 8 | 78 | 2 | 3 | 10.0K |
|  | CNN | 9 | 4 | 78 | 1 | 1 | 219.0K |
|  | Linear | — | — | 32 | — | — | 20.0K |
| cnn-stride4 | CNN | 16 | 8 | 100 | 4 | 3 | 12.8K |
|  | CNN | 5 | 4 | 78 | 1 | 1 | 200.0K |
|  | Linear | — | — | 32 | — | — | 25.6K |
| cnn-stride8 | CNN | 16 | 8 | 126 | 8 | 3 | 16.1K |
|  | CNN | 5 | 4 | 78 | 1 | 1 | 190.5K |
|  | Linear | — | — | 32 | — | — | 32.2K |

In some implementations, a KWS system may use a CNN that pools, e.g., samples, in time, by a non-overlapping amount. For instance, the CNN may pool in time by p=2 or p=4. The CNN may have a frequency stride of v=1, a time stride of s=1, or both. Table 5 represents configurations of CNN architectures, cnn-tpool2 and cnn-tpool3, where the pooling in time p is varied, e.g., where p=2 and p=3 respectively. In some examples, a CNN that pools in time may increase the number of feature maps n while keeping the total number of parameters for the CNN constant.

TABLE 5

CNN Architectures for pooling in time

| Model | Type | m | r | n | p | q | Parameters |
|---|---|---|---|---|---|---|---|
| cnn-tpool2 | CNN | 21 | 8 | 94 | 2 | 3 | 5.6M |
|  | CNN | 6 | 4 | 94 | 1 | 1 | 1.8M |
|  | Linear | — | — | 32 | — | — | 65.5K |
| cnn-tpool3 | CNN | 15 | 8 | 94 | 3 | 3 | 7.1M |
|  | CNN | 6 | 4 | 94 | 1 | 1 | 1.6M |
|  | Linear | — | — | 32 | — | — | 65.5K |

Figure 3:
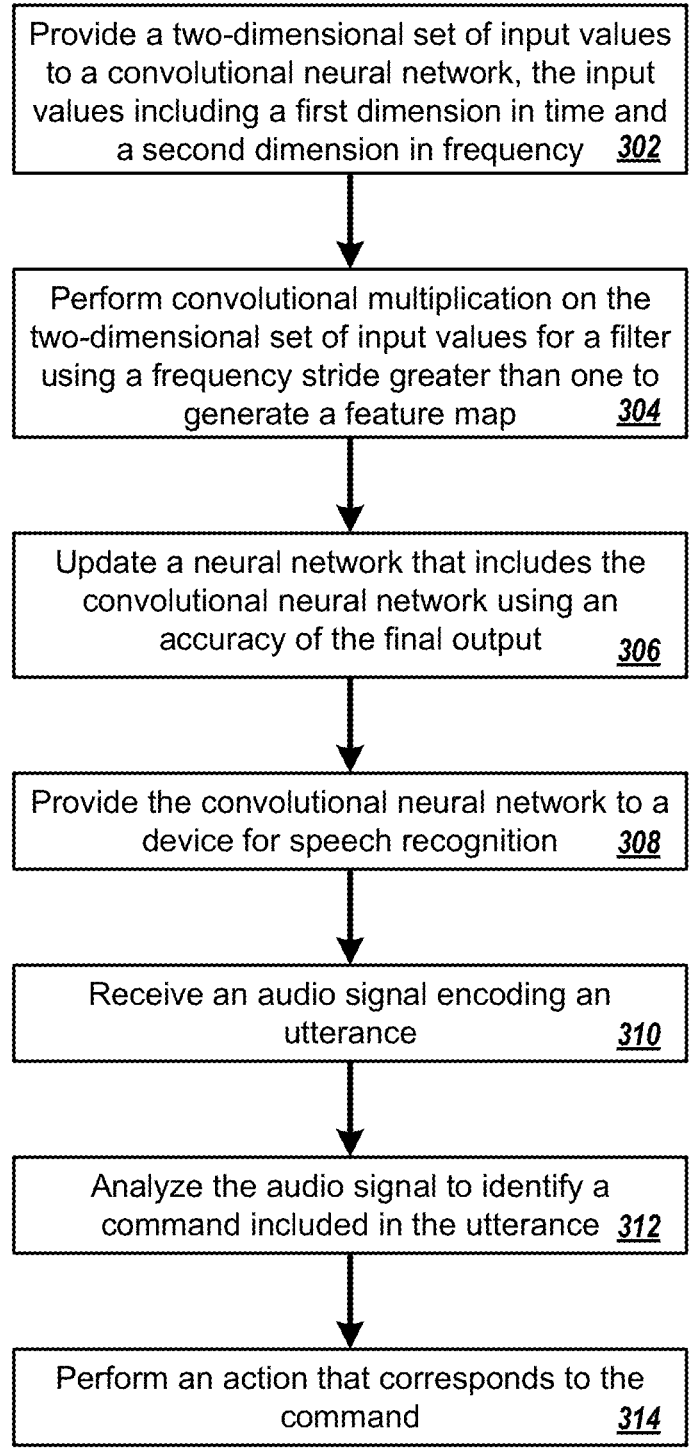
FIGS. 3 and 4 are flow diagrams of processes for determining an output for a convolutional neural network.

FIG. 3 is a flow diagram of a process 300 for determining an output for a convolutional neural network (CNN). For example, the process 300 can be used by the KWS system 100 or the CNN 200 or another system that includes the KWS system 100, the CNN 200, or both.

The KWS system provides a two-dimensional set of input values to a convolutional neural network, the input values including a first dimension in time and a second dimension in frequency (302). For example, the KWS system includes a feature extraction model that receives an audio signal encoding an utterance and generates frames representing features of the utterance at specific points in time. The feature extraction module provides multiple frames to the convolutional neural network. The number of frames the features extraction module sends to the convolutional neural network is determined by the first dimension in time.

The KWS system performs convolutional multiplication on the two-dimensional set of input values for a filter using a frequency stride greater than one to generate a feature map (304). For instance, the CNN uses a filter with a frequency stride greater than one to generate the feature map. The CNN may use the same size filter and the same frequency stride to generate a plurality of feature maps while using different weights, or sets of weights, for each of the feature maps. Each of the feature maps may represent a different feature of the frames included in the set of input values.

The KWS system updates a neural network that includes the convolutional neural network using an accuracy of a final output (306). For example, the CNN provides an output to another layer in the KWS system. The output may contain values from the feature maps or values based on the feature maps. The other layer processes the output, potentially providing further output to additional layers in the KWS system. A final output of the layers, e.g., determined by a softmax layer in the neural network, is provided to a posterior handling module and the posterior handling module determines a classification the utterance encoded in the audio signal. For instance, the posterior handling module may determine whether the utterance is a keyword, key phrase, or other content, e.g., filler.

During training, the KWS system determines an accuracy of the determination made by the posterior handling module and updates the neural network accordingly. For example, the KWS system may update one or more CNN layers included in the KWS system, one or more DNN layers included in the KWS system, or both. The KWS system may use any appropriate method to update the neural network and the layers included in the neural network.

A system provides the convolutional neural network to a device for keyword detection (308). For instance, after training, a server may provide the convolutional neural network to a mobile device for use during keyword detection.

The KWS system receives an audio signal encoding an utterance (310). For example, a microphone included in the mobile device records the audio signal. The mobile device provides the audio signal to the KWS system, and the included CNN, to determine whether the audio signal encodes an utterance that includes a keyword or a key phrase.

The KWS system analyzes the audio signal to identify a command included in the utterance (312). For instance, the KWS system uses the CNN to determine whether the utterance encoded in the audio signal includes a command, e.g., a keyword or a key phrase, or does not include a command. One example of a command includes "answer call." For instance, the KWS system is trained to detect particular keywords, key phrases, or both, and classify any other words or phrases as filler by comparing frames from an utterance and corresponding audio features with representative audio features for the particular keywords and key phrases. The KWS system uses the CNN and potentially other layers in a neural network to compare the audio features for the utterance to the representative audio features for the particular keywords and key phrases.

A system performs an action that corresponds to the command (314). For example, when the KWS system determines that the utterance is a command, e.g., the command "answer call," the KWS system provides the mobile device with a message that indicates the command. The mobile device may provide the message to an application associated with the command, such as a phone application when the command is "answer call." The application may then perform an action, such as connecting a telephone call, that corresponds to the command.

In some implementations, the process 300 can include additional steps, fewer steps, or some of the steps can be divided into multiple steps. For example, the KWS system may perform steps 302, 304, and 306, one or more times, without performing the other steps in the process 300.

In some examples, a system may perform steps 310, 312, and 314, or a subset of these steps, without performing the other steps in the process 300. For instance, a mobile device may receive the CNN, receive an audio signal encoding an utterance, analyze the audio signal using the CNN, and other layers included in a KWS system, and determine that the utterance is not a keyword or a key phrase, and perform steps 310 and 312 again multiple times, e.g., for other utterances. The mobile device may then determine that another utterance is a keyword or a key phrase and perform an action in response to the determination.

Figure 4:
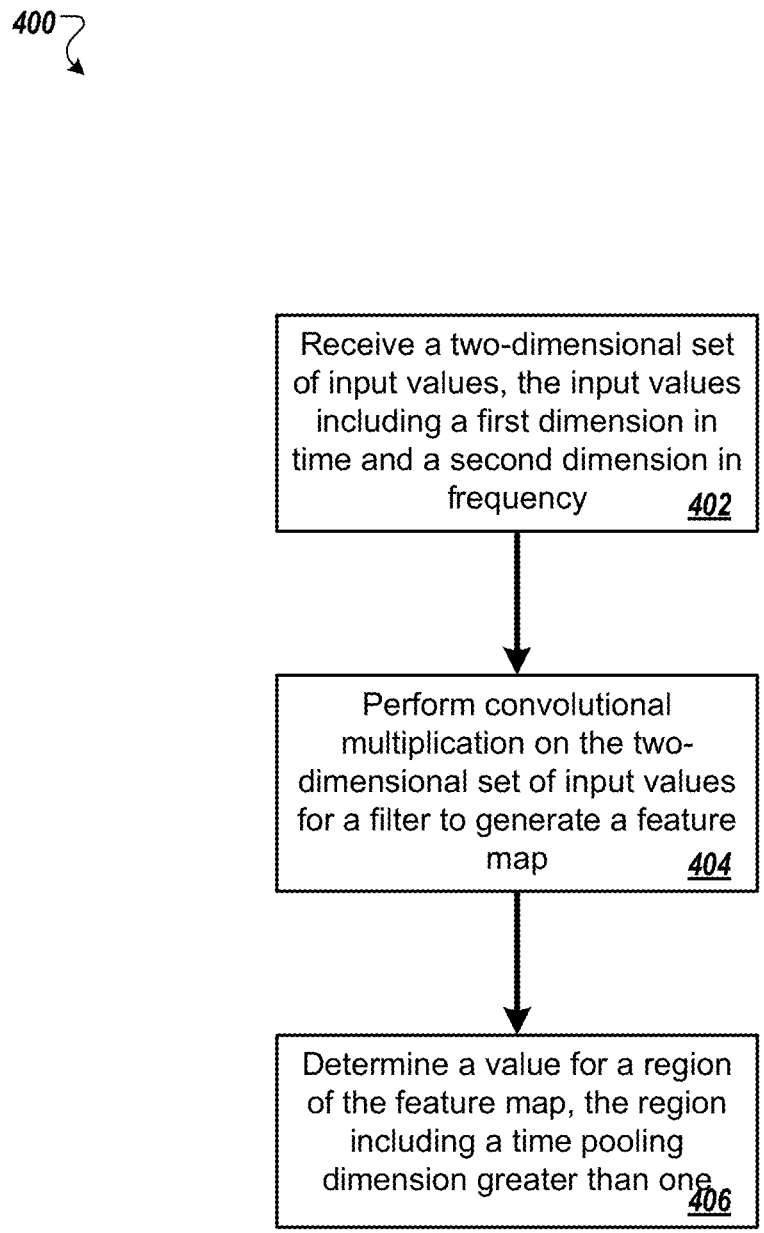

FIG. 4 is a flow diagram of a process 400 for determining an output for a convolutional neural network (CNN). For example, the process 400 can be used by the CNN 200.

The CNN receives a two-dimensional set of input values, the input values including a first dimension in time and a second dimension in frequency (402). For example, the KWS system includes a feature extraction model that receives an audio signal encoding an utterance and generates frames representing features of the utterance at specific points in time. The feature extraction module provides multiple frames, determined by the first dimension in time, to the CNN.

The CNN performs convolutional multiplication on the two-dimensional set of input values for a filter to generate a feature map (404). For instance, the CNN uses a filter to generate the feature map. The filter may have a time dimension of m=21, a frequency dimension of r=8, or both. The CNN may use the same size filter and the same frequency stride and time stride to generate a plurality of feature maps while using different weights, or sets of weights, for each of the feature maps. Each of the feature maps may represent a different feature of the frames included in the set of input values, and the corresponding audio signal.

The CNN determines a value for a region of the feature map, the region including a time pooling dimension greater than one (406). For instance, the CNN may determine a region in a feature map with a time pooling dimension of p=2, a frequency pooling dimension of q=3, or both. The value for the region may be a maximum value, an average, or any other appropriate value for the region.

In some implementations, the process 400 can include additional steps, fewer steps, or some of the steps can be divided into multiple steps. For example, the process 400 may include one or more of steps 306 through 314. In some examples, a KWS system may perform multiple iterations of steps 402, 404, 406, and 306 during training of a CNN.

In some implementations, a mobile device may perform steps 310, 312, and 314 one or more times using a CNN trained by the process 400. For instance, the mobile device may receive the CNN, trained by the process 400, from a server. The mobile device may use the CNN as part of a KWS system to determine whether utterances encoded in audio signals include keywords or key phrases for which the CNN, and the KWS system, were trained.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 5:
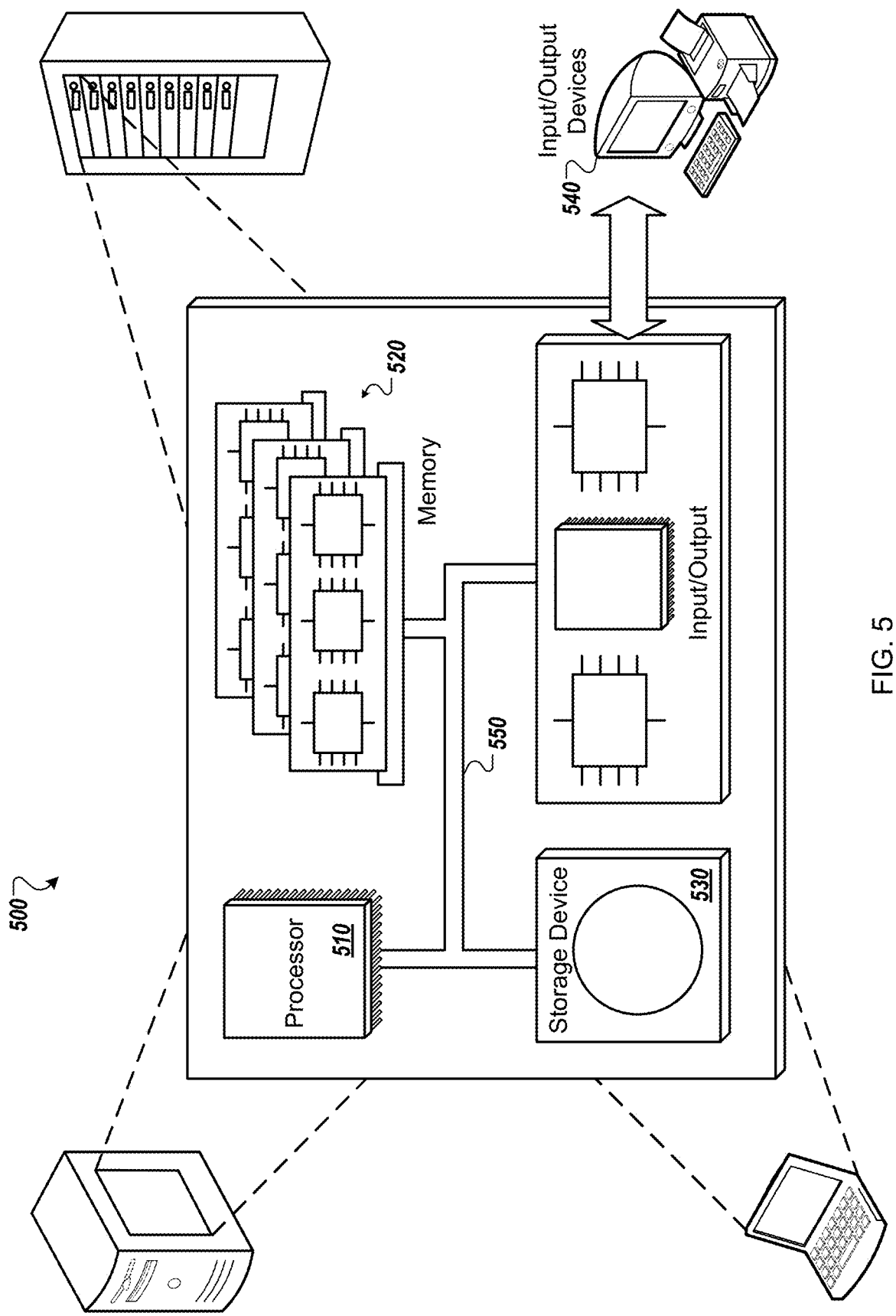
FIG. 5 is a block diagram of a computing system that can be used in connection with computer-implemented methods described in this document.

An example of one such type of computer is shown in FIG. 5, which shows a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

While this specification contains many specific implementation details, these should not be construed as limitations on the scope of what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A non-transitory computer readable storage medium storing instructions executable by a data processing apparatus and upon such execution cause the data processing apparatus to perform operations comprising:
   training, by a keyword detection system, a convolutional neural network that comprises a first convolutional layer and a second convolutional layer, the convolutional neural network being trained for keyword detection of one or more key phrases by:
      providing a two-dimensional set of input values to the convolutional neural network, the input values including values across a first dimension in time and values across a second dimension in frequency;
      selecting, for use with the first convolutional layer only of the convolutional neural network, a filter having (i) a time span that extends over all of the input values in the first dimension, and (ii) a frequency span that extends over less than all of the input values in the second dimension;
      performing convolutional multiplication on the two-dimensional set of input values for the filter that has (i) the time span that extends over all of the input values in the first dimension, and (ii) the frequency span that extends over of less than all of the input values in the second dimension, using (i) a frequency stride greater than one, and (ii) a time stride equal to one, to generate a first output comprising a feature map; generating, by the second convolutional layer of the convolutional neural network, using the feature map, a second output;
      generating, by a linear low rank layer, using the second output, a third output;
      generating, by a deep neural network, using the third output, a fourth output;
      generating, by a softmax layer, using the fourth output, a final output; and
      updating, using the final output, a set of weight values for the filter without pooling values in the feature map in frequency; and
   after training the convolutional neural network for keyword detection, providing, by the keyword detection system, the trained convolutional neural network to a device for use by the device during keyword detection of the one or more key phrases.

2. The computer readable storage medium of claim 1, wherein performing convolutional multiplication on the two-dimensional set of input values comprises performing convolutional multiplication on the two-dimensional set of input values for the filter using a frequency stride of four to generate the feature map.

3. The computer readable storage medium of claim 1, wherein performing convolutional multiplication on the two-dimensional set of input values for the filter comprises performing convolutional multiplication on the two-dimensional set of input values for the filter, the filter comprising a frequency span of exactly eight and a time span of exactly thirty -two.

4. The computer readable storage medium of claim 1, wherein performing convolutional multiplication on the two-dimensional set of input values for the filter comprises performing convolutional multiplication on the two-dimensional set of input values for n different filters using a frequency stride greater than one for each of the n different filters to generate n different feature maps, each of the feature maps generated using a corresponding filter.

5. The computer readable storage medium of claim 4, wherein performing convolutional multiplication on the two-dimensional set of input values for the n different filters using a frequency stride greater than one for each of the n different filters to generate the n different feature maps comprises performing convolutional multiplication on the two-dimensional set of input values for the n different filters, each of the n different filters having a size that is the same as the sizes of the other filters.

6. The computer readable storage medium of claim 1, wherein:
   the feature map comprises a matrix;
   the second output comprises a matrix; and
   generating, by the linear low rank layer, the third output using the second output comprises:
      creating a vector from the second output; and
      generating the third output using the vector.

7. The computer readable storage medium of claim 1, wherein the operations further comprise:
   using the convolutional neural network for keyword detection by:
      receiving an audio signal encoding an utterance;
      analyzing the audio signal to identify a command included in the utterance; and
      performing an action that corresponds to the command.

8. A system comprising:
   a data processing apparatus; and
   a non-transitory computer readable storage medium in data communication with the data processing apparatus and storing instructions executable by the data processing apparatus and upon such execution cause the data processing apparatus to perform operations comprising:
      training, by a keyword detection system, a convolutional neural network that comprises a first convolutional layer and a second convolutional layer, the convolutional neural network being trained for keyword detection of one or more key phrases by:

providing a two-dimensional set of input values to the convolutional neural network, the input values including values across a first dimension in time and values across a second dimension in frequency;

selecting, for use with the first convolutional layer only of the convolutional neural network, a filter having (i) a time span that extends over all of the input values in the first dimension, and (ii) a frequency span that extends over less than all of the input values in the second dimension;

performing convolutional multiplication on the two-dimensional set of input values for the filter that has (i) the time span that extends over all of the input values in the first dimension, and (ii) the frequency span that extends over of less than all of the input values in the second dimension, using (i) a frequency stride greater than one, and (ii) a time stride equal to one, to generate a first output comprising a feature map; generating, by the second convolutional layer of the convolutional neural network, using the feature map, a second output;

generating, by a linear low rank layer, using the second output, a third output;

generating, by a deep neural network, using the third output, a fourth output;

generating, by a softmax layer, using the fourth output, a final output; and updating, using the final output, a set of weight values for the filter without pooling values in the feature map in frequency; and after training the convolutional neural network for keyword detection, providing, by the keyword detection system, the trained convolutional neural network to a device for use by the device during keyword detection of the one or more key phrases.

9. The system of claim 8, wherein performing convolutional multiplication on the two-dimensional set of input values comprises performing convolutional multiplication on the two-dimensional set of input values for the filter using a frequency stride of four to generate the feature map.

10. The system of claim 8, wherein performing convolutional multiplication on the two-dimensional set of input values for the filter comprises performing convolutional multiplication on the two-dimensional set of input values for the filter, the filter comprising a frequency span of exactly eight and a time span of exactly thirty-two.

11. The system of claim 8, wherein performing convolutional multiplication on the two-dimensional set of input values for the filter comprises performing convolutional multiplication on the two-dimensional set of input values for n different filters using a frequency stride greater than one for each of the n different filters to generate n different feature maps, each of the feature maps generated using a corresponding filter.

12. The system of claim 11, wherein performing convolutional multiplication on the two-dimensional set of input values for the n different filters using a frequency stride greater than one for each of the n different filters to generate the n different feature maps comprises performing convolutional multiplication on the two-dimensional set of input values for the n different filters, each of the n different filters having a size that is the same as the sizes of the other filters.

13. The system of claim 8, wherein:
the feature map comprises a matrix;
the second output comprises a matrix; and
generating, by the linear low rank layer, a third output using the second output comprises:
creating a vector from the second output; and
generating the third output using the vector.

14. The system of claim 8, wherein the operations further comprise, using the convolutional neural network for keyword detection by:
receiving an audio signal encoding an utterance;
analyzing the audio signal to identify a command included in the utterance; and
performing an action that corresponds to the command.

15. A computer-implemented method comprising:
training, by a keyword detection system, a convolutional neural network that comprises a first convolutional layer and a second convolutional layer, the convolutional neural network being trained for keyword detection of one or more key phrases by:
providing a two-dimensional set of input values to the convolutional neural network, the input values including values across a first dimension in time and values across a second dimension in frequency;
selecting, for use with the first convolutional layer only of the convolutional neural network, a filter having (i) a time span that extends over all of the input values in the first dimension, and (ii) a frequency span that extends over less than all of the input values in the second dimension;
performing convolutional multiplication on the two-dimensional set of input values for the filter that has (i) the time span that extends over all of the input values in the first dimension, and (ii) the frequency span that extends over of less than all of the input values in the second dimension, using (i) a frequency stride greater than one, and (ii) a time stride equal to one, to generate a first output comprising a feature map; generating, by the second convolutional layer of the convolutional neural network, using the feature map, a second output;
generating, by a linear low rank layer, using the second output, a third output;
generating, by a deep neural network, using the third output, a fourth output;
generating, by a softmax layer, using the fourth output, a final output; and
updating, using the final output, a set of weight values for the filter without pooling values in the feature map in frequency; and
after training the convolutional neural network for keyword detection, providing, by the keyword detection system, the trained convolutional neural network to a device for use by the device during keyword detection of the one or more key phrases.

16. The method of claim 15, wherein performing convolutional multiplication on the two-dimensional set of input values comprises performing convolutional multiplication on the two-dimensional set of input values for the filter using a frequency stride of four to generate the feature map.

* * * * *